United States Patent
Tamura et al.

(10) Patent No.: US 10,340,514 B2
(45) Date of Patent: Jul. 2, 2019

(54) NEGATIVE ELECTRODE FOR LITHIUM ION SECONDARY BATTERY, AND LITHIUM ION SECONDARY BATTERY

(71) Applicant: NEC Corporation, Minato-ku, Tokyo (JP)

(72) Inventors: Noriyuki Tamura, Tokyo (JP); Ryota Yuge, Tokyo (JP); Qian Cheng, Tokyo (JP); Kentaro Nakahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 682 days.

(21) Appl. No.: 14/910,045

(22) PCT Filed: Aug. 20, 2014

(86) PCT No.: PCT/JP2014/071776
§ 371 (c)(1),
(2) Date: Feb. 4, 2016

(87) PCT Pub. No.: WO2015/025887
PCT Pub. Date: Feb. 26, 2015

(65) Prior Publication Data
US 2016/0190562 A1 Jun. 30, 2016

(30) Foreign Application Priority Data

Aug. 23, 2013 (JP) .................................. 2013-173284

(51) Int. Cl.
*H01M 4/36* (2006.01)
*H01M 4/505* (2010.01)
(Continued)

(52) U.S. Cl.
CPC .......... *H01M 4/366* (2013.01); *H01M 4/131* (2013.01); *H01M 4/386* (2013.01); *H01M 4/483* (2013.01);
(Continued)

(58) Field of Classification Search
None
See application file for complete search history.

(56) References Cited

U.S. PATENT DOCUMENTS

| | | | |
|---|---|---|---|
| 6,377,030 B1 * | 4/2002 | Asao | H01M 10/052 320/161 |
| 6,946,223 B2 * | 9/2005 | Kusumoto | H01M 4/13 429/231.8 |
| 2016/0104884 A1 | 4/2016 | Hirose et al. | |

FOREIGN PATENT DOCUMENTS

| | | |
|---|---|---|
| JP | 2000-36323 A | 2/2000 |
| JP | 2008-153078 A | 7/2008 |

(Continued)

OTHER PUBLICATIONS

Japanese Office Action for JP Application No. 2015-532879 dated Mar. 13, 2018 with English Translation.
(Continued)

*Primary Examiner* — Basia A Ridley
*Assistant Examiner* — Heng M. Chan

(57) ABSTRACT

A negative electrode for a lithium ion secondary battery, including a negative electrode active material layer containing a negative electrode active material including silicon (Si) as a constituent element, in which a coating including iron (Fe), manganese (Mn) and oxygen (O) as constituent elements is formed on a surface of the negative electrode active material layer.

17 Claims, 4 Drawing Sheets

(51) Int. Cl.
| | |
|---|---|
| *H01M 4/525* | (2010.01) |
| *H01M 4/131* | (2010.01) |
| *H01M 4/48* | (2010.01) |
| *H01M 4/38* | (2006.01) |
| *H01M 10/0525* | (2010.01) |
| *H01M 10/052* | (2010.01) |
| *H01M 4/02* | (2006.01) |

(52) U.S. Cl.
CPC ........... *H01M 4/505* (2013.01); *H01M 4/525* (2013.01); *H01M 10/0525* (2013.01); *H01M 10/052* (2013.01); *H01M 2004/027* (2013.01)

(56) References Cited

FOREIGN PATENT DOCUMENTS

| JP | 2009-38036 A | 2/2009 |
|---|---|---|
| JP | 2009-158415 A | 7/2009 |
| JP | 2011-187169 A | 9/2011 |
| JP | 2013-008587 A | 1/2013 |
| JP | 2013-37823 A | 2/2013 |
| JP | 2013-62082 A | 4/2013 |

OTHER PUBLICATIONS

International Search Report for PCT Application No. PCT/JP2014/071776, dated Sep. 30, 2014.

\* cited by examiner

NEGATIVE ELECTRODE FOR LITHIUM ION SECONDARY BATTERY, AND LITHIUM ION SECONDARY BATTERY

This application is a National Stage Entry of PCT/JP2014/071776 filed on Aug. 20, 2014, which claims priority from Japanese Patent Application 2013-173284 filed on Aug. 23, 2013 the contents of all of which are incorporated herein by reference, in their entirety.

TECHNICAL FIELD

The present invention relates to a negative electrode for a lithium ion secondary battery, and a lithium ion secondary battery.

BACKGROUND ART

A lithium ion secondary battery is widely practically used as a battery for compact electronic equipment such as a notebook personal computer and a cellular phone owing to its advantages such as a high energy density, small self-discharge and long-term reliability. At present, a carbon material and lithium cobalt oxide ($LiCoO_2$) are generally used respectively as a negative electrode active material and a positive electrode active material of a lithium ion secondary battery, and lithium ion secondary batteries using these materials have been commercialized.

In recent years, however, electronic equipment has been increased in functionality and used in electric vehicles, and there is a demand for development of a lower cost and higher performance lithium ion secondary battery.

As for the negative electrode active material, a negative electrode active material containing silicon (Si) as a constituent element is being developed as a high-capacity material to be used instead of a carbon material.

As for the positive electrode active material, nickel-based and manganese-based materials are being developed from the viewpoint of cost and capacity. For example, a lithium manganese-based composite oxide having a layered rock-salt structure as a crystal structure is being examined.

Patent Literature 1 describes a negative electrode including a negative electrode active material layer containing a negative electrode active material containing silicon (Si) as a constituent element; and a coating layer covering the negative electrode active material layer and containing an oxide of a 3d transition metal element (at least one selected from the group consisting of iron (Fe), cobalt (Co) and nickel (Ni)). Patent Literature 1 discloses that a lithium ion secondary battery including this negative electrode can be improved in cyclability.

Patent Literature 2 describes a secondary battery including a positive electrode containing a positive electrode active material including a lithium transition metal oxide; a negative electrode including a negative electrode active material layer containing a negative electrode active material including a silicon-containing particle and a binding agent; and an electrolyte, in which the negative electrode active material layer further contains a transition metal-silicon alloy particle made of an alloy containing the same element as the transition metal (Mn, Fe or Ni) contained in the lithium transition metal oxide, and Si. Patent Literature 2 discloses that a transition metal ion eluted from the positive electrode active material is preferentially deposited on the transition metal-silicon alloy particle for suppressing deposition of the transition metal on the surface of the negative electrode active material in this secondary battery, so that the resistance change in a high-temperature cycle can be suppressed.

Patent Literature 3 describes a lithium ion secondary battery including a positive electrode containing a positive electrode active material made of a layered rock-salt structure lithium manganese-based composite oxide containing a lithium (Li) element and a tetravalent manganese (Mn) element; a negative electrode containing a negative electrode active material made of a silicon oxide represented by SiOx (0.3×1.6); and an electrolyte solution containing a solvent or a liquid dispersion medium, an electrolyte and an additive of a specific polycyclic hydrocarbon compound (such as biphenyl and cyclohexylbenzene). Patent Literature 3 discloses that this secondary battery is suppressed in deterioration of the charge/discharge capacity otherwise caused after storage.

CITATION LIST

Patent Literature

Patent Literature 1: JP2008-153078A
Patent Literature 2: JP2013-62082A
Patent Literature 3: JP2013-37823A

SUMMARY OF INVENTION

Technical Problem

For a lithium ion secondary battery using, as a negative electrode active material, a material containing silicon as a constituent element, a problem is that a side reaction is easily caused through charging/discharging operations and hence cycle deterioration is caused early.

An object of the present invention is to solve the above-described problem, namely, to provide a lithium ion secondary battery excellent in cyclability and a negative electrode suitably used in the secondary battery.

Solution to Problem

One aspect of the present invention provides a negative electrode for a lithium ion secondary battery, including a negative electrode active material layer containing a negative electrode active material including silicon (Si) as a constituent element, in which a coating including iron (Fe), manganese (Mn) and oxygen (O) as constituent elements is formed on a surface of the negative electrode active material layer.

Another aspect of the present invention provides a lithium ion secondary battery including a positive electrode containing a positive electrode active material, the above-described negative electrode, and an electrolyte.

Another aspect of the present invention provides a method for producing the above-described lithium ion secondary battery, including forming the coating comprising Fe and Mn that are metal elements derived from the positive electrode on the surface of the negative electrode active material layer by performing at least constant current charging with a final voltage or a charging current changed in a stepwise manner at the time of performing an activation treatment by a charging/discharging operation including initial charging.

Advantageous Effects of Invention

An exemplary embodiment can provide a lithium ion secondary battery excellent in cyclability and a negative electrode suitably used in the secondary battery.

DESCRIPTION OF EMBODIMENT

Figure 1:
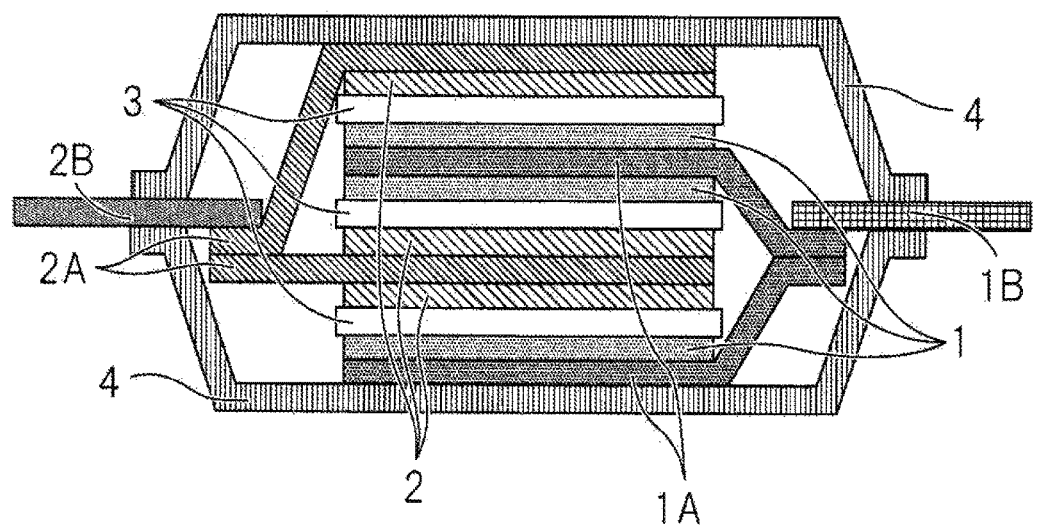
FIG. 1 is a cross-sectional view of an example of a lithium ion secondary battery according to an exemplary embodiment of the present invention.

A negative electrode for a lithium ion secondary battery according an exemplary embodiment of the present invention includes a negative electrode active material layer containing a negative electrode active material containing silicon (Si) as a constituent element, and a coating containing iron (Fe), manganese (Mn) and oxygen (O) as constituent elements is formed on a surface of the negative electrode active material layer. Since this coating is formed, a side reaction otherwise occurring in a negative electrode active material can be suppressed, so that the cyclability of a lithium ion secondary battery using this negative electrode can be improved.

The lithium ion secondary battery according to the exemplary embodiment of the present invention includes a positive electrode containing a positive electrode active material, the above-described negative electrode, and an electrolyte. The positive electrode active material preferably contains a lithium iron manganese-based composite oxide having a layered rock-salt structure and represented by the following formula (1):

$$Li_xM^1{}_yM^2{}_{z-s}Fe_sO_{2-\delta} \qquad (1)$$

wherein x, y, z, s and δ satisfy conditions of 1.05≤x≤1.32, 0.33≤y≤0.63, 0.06≤z≤0.50, 0.06≤s≤0.50, z≥s, and 0≤δ≤0.80, $M^1$ represents at least one metal element selected from Mn, Ti and Zr, and including Mn, and $M^2$ represents at least one metal element selected from Co, Ni and Mn.

The coating is preferably a coating that is formed by performing constant current charging (and further performing constant voltage charging in some cases) with a final voltage changed in a stepwise manner, or performing constant current charging with a charging current changed in a stepwise manner at the time of performing an activation treatment by a charging/discharging operation including initial charging, and contains Fe and Mn that are the metal elements derived from the positive electrode.

A method for producing a lithium ion secondary battery according to the exemplary embodiment of the present invention is a method for producing the above-described lithium ion secondary battery, and includes the step of forming, on a surface of a particle of the negative electrode active material, the coating containing Fe and Mn that are the metal elements derived from the positive electrode by performing, at the time of performing an activation treatment by a charging/discharging operation including initial charging, constant current charging (and further performing constant voltage charging in some cases) with a final voltage changed in a stepwise manner, or by performing constant current charging with a charging current changed in a stepwise manner.

Since such stepwise charging is thus performed at the time of performing the activation treatment, the coating more effective to improve cyclability can be formed. At this point, it seems that the metal elements such as Fe and Mn contained in the positive electrode active material are dissolved in the electrolyte during the stepwise charging, so that a dense coating containing the dissolved metal components can be formed on the particle of the negative electrode active material on the surface of the negative electrode active material layer.

Now, the exemplary embodiment of the present invention will be described in details.

(Negative Electrode Active Material and Negative Electrode)

The negative electrode for a lithium ion secondary battery according to the exemplary embodiment of the present invention contains a negative electrode active material layer containing a negative electrode active material containing silicon (Si) as a constituent element, and a binder; and a coating formed on a surface of the negative electrode active material layer and containing iron (Fe), manganese (Mn) and oxygen (O) as constituent elements.

A ratio (Fe/Si) of Fe of the coating to Si of the negative electrode active material layer is preferably in a range of 0.001% by mass or more and 1.0% by mass or less, and more preferably in a range of 0.002% by mass or more and 0.5% by mass or less. Besides, a ratio (Mn/Si) of Mn of the coating to Si of the negative electrode active material layer is preferably in a range of 0.01% by mass or more and 5.0% by mass or less, and more preferably in a range of 0.02% by mass or more and 3.0% by mass or less. The coating preferably further contains nickel (Ni) as a constituent element. A ratio (Ni/Si) of Ni of the coating to Si of the negative electrode active material layer is preferably in a range of 0.01% by mass or more and 5.0% by mass or less, and more preferably in a range of 0.02% by mass or more and 3.0% by mass or less. If the ratios among these metal components fall in these ranges, a higher effect (to improve cyclability) by forming the coating can be attained. Besides, if the ratios of the metal components are too high, the other battery characteristics such as discharge capacity may be degraded in some cases, and therefore, the ratios of the metal components preferably fall in the above-described ranges.

The coating is preferably a coating that is formed by performing, at the time of performing an activation treatment by a charging/discharging operation including initial charging, constant current charging (and further performing constant voltage charging in some cases) with a final voltage increased in a stepwise manner, and contains metal elements (Fe and Mn in particular) derived from the positive electrode. Besides, the coating is preferably a film that is formed by performing, at the time of performing the activation treatment by the charging/discharging operation including the initial charging, the constant current charging with the final voltage set constant over respective charging steps and with the charging current lowered in a stepwise manner, and contains the metal elements (Fe and Mn, in particular) derived from the positive electrode.

If a positive electrode active material containing cobalt (Co) is used, the coating may further contain cobalt (Co) as a constituent element.

The thickness of the coating is, from the viewpoint of attaining a sufficient effect by forming the coating, preferably in a range of 10 nm or more and 2000 nm or less, and more preferably in a range of 20 nm or more and 1000 nm or less. If the coating is too thin, the effect cannot be sufficiently attained, and if it is too thick, it is apprehended that the battery characteristics such as the discharge capacity may be degraded.

The coating can be formed at the time of performing the activation treatment by the charging/discharging operation including the initial charging. It seems that the stepwise charging can not only activate the positive electrode but also incorporate, in accordance with the charging, the metal components (Fe and Mn in particular) eluted from the positive electrode into the coating on the negative electrode, so that a dense film more effective to improve cyclability can be formed.

The negative electrode active material contained in the negative electrode according to the exemplary embodiment of the present invention contains a particle of the negative electrode active material containing silicon (Si) as a constituent element (hereinafter suitably referred to as the "silicon-containing particle").

Examples of a material of the silicon-containing particle include silicon and a silicon compound. Examples of the silicon compound include a silicon oxide, a silicate, and a compound of a transition metal and silicon such as nickel silicide or cobalt silicide. The silicon compound has a role to reduce expansion and contraction of the negative electrode active material itself through repeated charging/discharging, and is preferably used also from the viewpoint of the charge/discharge cyclability. Besides, some types of silicon compounds play a role to secure conductivity between silicons. From this point of view, a silicon oxide is preferably used as the silicon compound.

The silicon oxide is not especially limited, and for example, those represented by $SiO_x$ ($0<x<2$) can be used. The silicon oxide may contain Li, and as a silicon oxide containing Li, for example, those represented by $SiLi_yO_z$ ($y>0$ and $2>z>0$) can be used. Besides, the silicon oxide may contain a small amount of a metal element or a non-metal element. The range of x (or z) of the formula representing the silicon oxide is preferably $0.5 \leq x \leq 1.5$ (or $0.5 \leq z \leq 1.5$). If x (or z) is 0.5 or more, a silicon phase (or a Si particle) can be prevented from having an excessive amount, and hence the volume change can be easily suppressed. Besides, if x (or z) is 1.5 or less, the amount of the silicon phase (or the Si particle) is increased, and hence the charge/discharge capacity can be easily increased. The silicon oxide is preferably constituted to have the silicon phase (the Si particle) inside a silicon oxide phase. If it has the silicon phase, the charge/discharge capacity is increased, and if the silicon oxide phase is present around the silicon phase, the volume change is suppressed.

The silicon oxide may contain, for example, one, two or more elements selected from nitrogen, boron and sulfur in a content of, for example, 0.1 to 5% by mass. If it contains a small amount of a metal element or non-metal element, the electrical conductivity of the silicon oxide can be improved.

Besides, the silicon oxide may have a crystal structure, and it is preferable that the whole or part of the silicon oxide has an amorphous structure. A silicon oxide having an amorphous structure has a large effect on the suppression of volume expansion of silicon or a carbon component used as another negative electrode active material component. Besides, the silicon oxide having an amorphous structure is regarded to have a comparatively small influence on ununiformity such as a grain boundary and a defect. It can be confirmed by X-ray diffraction measurement (general XRD measurement) that the whole or part of the silicon oxide has an amorphous structure. Specifically, if a silicon oxide does not have an amorphous structure, a peak peculiar to the silicon oxide is observed, but if the whole or part of the silicon oxide has an amorphous structure, the peak peculiar to the silicon oxide is observed as a broad peak.

In the silicon oxide, the whole or part of the silicon is preferably dispersed. The silicon can be dispersed in an amorphous silicon oxide. The content of the Si particle in the silicon oxide is preferably 35 to 65% by mass. If at least part of the silicon is dispersed in the silicon oxide, the volume expansion of the negative electrode as a whole can be more suppressed. Incidentally, it can be confirmed by employing both transmission electron microscope observation (general TEM observation) and energy dispersive X-ray spectroscopy measurement (general EDX measurement) that the whole or part of the silicon is dispersed in the silicon oxide. Specifically, the cross-section of a sample containing the silicon is observed, the oxygen concentration in a particle dispersed in the silicon oxide is measured, and it can be thus determined that the silicon contained in the particle is not an oxide.

The content of the silicon oxide in the negative electrode active material is, from the viewpoint of improvement of a charge/discharge cycle life and the like, preferably 5% by mass or more, more preferably 15% by mass or more, and further preferably 45% by mass or more, and from the viewpoint of a current collecting property and the like, preferably 90% by mass or less, more preferably 80% by mass or less, and further preferably 70% by mass or less.

The content of the silicon in the negative electrode active material is, from the viewpoint of the charge/discharge capacity and the like, preferably 5% by mass or more, more preferably 10% by mass or more, and further preferably 20% by mass or more, and from the viewpoint of the charge/discharge cycle life and the like, preferably 90% by mass or less, more preferably 80% by mass or less, and further preferably 50% by mass or less.

A mass ratio (a/b) between the silicon (a) and the silicon oxide (b) in the negative electrode active material is not especially limited, but is set to preferably a range of 5/95 to 90/10, more preferably a range of 10/90 to 80/20, and can be set to a range of 30/70 to 60/40.

The silicon-containing particle preferably contains, in addition to the silicon or silicon oxide, a carbon component capable of intercalating/deintercalating a lithium ion. The carbon component can be contained in the form of a composite with the silicon or silicon oxide. The carbon component has a role to reduce the expansion and contraction of the negative electrode active material itself through the repeated charging/discharging and to secure conductivity between the silicons used as the negative electrode active material. Accordingly, if the silicon, the silicon oxide and the carbon component coexist, better cyclability can be obtained.

As a material of the carbon component, graphite, amorphous carbon, diamond-like carbon, carbon nanotube, or a composite of any of these can be used. Here, graphite having high crystallinity has high electrical conductivity and is good in adhesion to a current collector, made of a metal such as copper, and in voltage flatness. On the other hand, amorphous carbon having low crystallinity has comparatively small volume expansion, and hence, has a large effect on the reduction of the volume expansion of the whole negative electrode, and in addition, is difficult to be degraded due to ununiformity such as a grain boundary and a defect.

The content of the carbon component in the negative electrode active material is, from the viewpoint of the improvement of the conductivity, the charge/discharge cycle life and the like, preferably 1% by mass or more, and more preferably 2% by mass or more, and from the viewpoint of sufficient secure of the charge/discharge capacity, preferably 50% by mass or less, and more preferably 30% by mass or less.

The silicon-containing particle used as the negative electrode active material in the present exemplary embodiment is preferably made of a composite containing silicon, a silicon oxide and a carbon component (hereinafter sometimes referred to as the Si/SiO/C composite). If the Si/SiO/C composite is used as the negative electrode active material, a secondary battery having better cyclability and capacity retention can be obtained.

The Si/SiO/C composite can be, for example, in a form where the silicon is dispersed in the silicon oxide and a surface of a particle containing the silicon oxide and the silicon is coated with the carbon component. If the silicon is dispersed in the silicon oxide, the volume expansion of the whole negative electrode can be further suppressed, and decomposition of the electrolyte can be suppressed.

The Si/SiO/C composite can be in a form where, for example, the whole or part of the silicon oxide has an amorphous structure, and the whole or part of the silicon is dispersed in the silicon oxide. Such a Si/SiO/C composite can be produced by, for example, a method disclosed in JP2004-47404A. Specifically, the silicon oxide may be disproportionated at 900 to 1400° C. under an atmosphere containing an organic gas such as a methane gas, and subjected to a thermal CVD treatment. Thus, the silicon contained in the silicon oxide is changed into a nanocluster to form a composite particle, and the surface of the composite particle is coated with the carbon component.

In the Si/SiO/C composite, a ratio among the silicon, the silicon oxide and the carbon component is not especially limited. The content of the silicon in the Si/SiO/C composite is preferably 5% by mass or more and 90% by mass or less, and more preferably 20% by mass or more and 50% by mass or less. The content of the silicon oxide in the Si/SiO/C composite is preferably 5% by mass or more and 90% by mass or less, and more preferably 40% by mass or more and 70% by mass or less. The content of the carbon component in the Si/SiO/C composite is preferably 2% by mass or more and 50% by mass or less, and more preferably 2% by mass or more and 30% by mass or less.

Besides, the Si/SiO/C composite can be made of a mixture of the silicon, the silicon oxide and the carbon component, and can be prepared by, for example, mixing a silicon particle, a silicon oxide particle and a carbon component particle by mechanical milling or the like. If the Si/SiO/C composite is prepared as an aggregate of the particles, the restraining force among the particles of the different materials can be appropriately retained, and hence, occurrence of residual stress or residual strain due to a difference in the volume change caused during the charging/discharging can be suppressed. For example, the silicon may have an average particle size smaller than that of the carbon component and that of the silicon oxide. Thus, the silicon, which is largely changed in the volume during the charging/discharging, has a relatively smaller particle size, and the carbon component and the silicon oxide, which are less changed in the volume, have relatively large particle sizes, and therefore, the particle size reduction of the alloy can be more effectively suppressed. Besides, during the charging/discharging process, the particle having a larger particle size and the particle having a smaller particle size alternately intercalate and deintercalate lithium, and thus, occurrence of residual stress and residual strain can be more effectively suppressed. The average particle size of the silicon can be, for example, 20 µm or less, and is preferably 15 µm or less, and more preferably 10 µm or less, and can be 5 µm or less. Besides, the average particle size of the silicon oxide is preferably ½ or less of the average particle size of the carbon component, and the average particle size of the silicon is preferably ½ or less of the average particle size of the silicon oxide. Furthermore, it is preferable that the average particle size of the silicon oxide is ½ or less of the average particle size of the carbon component and that the average particle size of the silicon is ½ or less of the average particle size of the silicon oxide. If the average particle sizes are controlled to fall in these ranges, the effect to reduce the volume expansion can be more effectively attained, and a secondary battery good in balance among the energy density and the cycle life and efficiency can be obtained. Here, an average particle size refers to a 50% cumulative diameter $D_{50}$ (median diameter) obtained through size distribution measurement (based on volume) by a laser diffraction scattering method.

The Si/SiO/C composite A may contain a composite particle B containing the silicon and the silicon oxide, and the carbon component. The Si/SiO/C composite A containing the composite particle B and the carbon component can be obtained by mechanically milling the composite particle B and a carbon component particle, or by coating the composite particle with the carbon component. Examples of a method for coating the composite particle B with the carbon component include a method in which an organic compound and the composite particle B are mixed and burnt, and a method in which the thermal CVD (chemical vapor deposition) is performed with the composite particle B introduced under a gas atmosphere of an organic compound of methane or the like.

The composite particle B can be obtained, for example, by burning the silicon and the silicon oxide at a high temperature under reduced pressure. Alternatively, it can be obtained by mechanically milling the silicon and the silicon oxide. The composite particle B can be in a form where the whole or part of the silicon oxide has an amorphous structure and the whole or part of the silicon is dispersed in the silicon oxide.

The surface of the Si/SiO/C composite may be treated with a silane coupling agent.

If a compound of a metal and silicon is used as the silicon compound, for example, a method in which the silicon and the metal are mixed and melted, or a method in which the metal is coated on the surface of the silicon by vapor deposition or the like can be employed.

The negative electrode active material contained in the negative electrode of the present exemplary embodiment may contain another negative electrode active material in addition to the silicon-containing particle. The content of the silicon-containing particle in the whole negative electrode active material is not especially limited, and can be set to, for example, 50% by mass or more, and is particularly preferably 60% by mass or more.

The specific surface area (obtained by general BET specific surface area measurement) of the negative electrode active material as a whole is preferably 0.2 $m^2/g$ or more, more preferably 1.0 $m^2/g$ or more and further preferably 2.0 $m^2/g$ or more, and preferably 9.0 $m^2/g$ or less, more preferably 8.0 $m^2/g$ or less and further preferably 7.0 $m^2/g$ or less. The average particle size of the negative electrode active material is preferably 0.01 µm or more, more preferably 0.1 µm or more and further preferably 0.2 µm or more, and preferably 30 µm or less and more preferably 20 µm or less, and can be set to 10 µm or less. From the viewpoint of the handleability in production, easiness of film formation, the battery characteristics and the like, the average particle size and the specific surface area of the negative electrode active material are preferably set to the above-described ranges. Here, the average particle size refers to a 50% cumulative diameter $D_{50}$ (median diameter) obtained through the size distribution measurement by the laser diffraction scattering method.

The negative electrode can be produced, for example, by forming, on a negative electrode current collector, a negative electrode active material layer containing the negative electrode active material and a binding agent. The negative electrode active material layer can be formed by a general slurry coating method. Specifically, a slurry containing the negative electrode active material, the binding agent and a solvent is prepared to be applied and dried on the negative electrode current collector, and a pressure is applied thereto if necessary, and thus, the negative electrode can be obtained. Examples of the method for applying the negative electrode slurry include a doctor blade method, a die coater method and a dip coating method. Alternatively, the negative electrode can be obtained by precedently forming the negative electrode active material layer and forming, as a current collector, a thin film of copper, nickel or an alloy of these by vapor deposition, sputtering or the like thereon.

The negative electrode active material layer may contain a conductive auxiliary agent such as carbon from the viewpoint of improving conductivity.

The binding agent for the negative electrode is not especially limited, and examples include polyvinylidene fluoride (PVdF), a vinylidene fluoride-hexafluoropropylene copolymer, a vinylidene fluoride-tetrafluoroethylene copolymer, a styrene-butadiene copolymer rubber, polytetrafluoroethylene, polypropylene, polyethylene, polyimide, polyamideimide, methyl(meth)acrylate, ethyl(meth)acrylate, butyl (meth)acrylate, (meth)acrylonitrile, isoprene rubber, butadiene rubber, and fluororubber. As the slurry solvent, N-methyl-2-pyrrolidone (NMP) or water can be used. If water is used as the solvent, carboxymethyl cellulose, methyl cellulose, hydroxymethyl cellulose, ethyl cellulose or polyvinyl alcohol can be further used as a thickener. In particular, if polyimide is used, the electrode is preferably burnt under an inert atmosphere for increasing the binding force through imidization. The temperature of this heat treatment can be set to a range of 300 to 500° C., and is preferably in a range of 350 to 400° C.

From the viewpoint of the binding force and the energy density in a trade-off relationship, the content of the binding agent for the negative electrode is, based on the negative electrode active material, preferably in a range of 0.1 to 30% by mass, more preferably in a range of 0.5 to 25% by mass, and further preferably in a range of 1 to 20% by mass.

The thickness of the negative electrode active material layer (the thickness of the single layer excluding the current collector) can be set to a range of 1 µm or more and 100 µm or less, and is preferably in a range of 5 µm or more and 50 µm or less.

The negative electrode current collector is not especially limited, and from the viewpoint of electrochemical stability, copper, nickel, stainless steel, molybdenum, tungsten, tantalum, or an alloy containing two or more of these is preferably used. The shape is, for example, a foil, a plate, or a mesh. The thickness of the negative electrode current collector is not especially limited, and can be set to, for example, a range of 5 to 50 µm, and is preferably in a range of 10 to 40 µm.

(Positive Electrode Active Material and Positive Electrode)

The positive electrode can be produced by, for example, preparing a slurry containing the positive electrode active material, a binding agent and a solvent (and a conductive auxiliary agent if necessary), and forming a positive electrode active material layer on a positive electrode current collector by applying and drying the slurry on the positive electrode current collector, and applying a pressure thereto if necessary.

The positive electrode active material is not especially limited, and for example, a lithium composite oxide, lithium iron phosphate or the like can be used. Examples of the lithium composite oxide include lithium manganese oxide ($LiMn_2O_4$); lithium cobalt oxide ($LiCoO_2$); lithium nickel oxide ($LiNiO_2$); an oxide obtained by substituting at least part of a manganese, cobalt or nickel portion of any of these lithium compounds with another metal element such as aluminum, magnesium, titanium, zinc or zirconium; nickel-substituted lithium manganate obtained by substituting at least part of manganese of lithium manganate with nickel; cobalt-substituted lithium nickelate obtained by substituting at least part of nickel of lithium nickelate with cobalt; an oxide obtained by substituting part of manganese of nickel-substituted lithium manganate with another metal (for example, at least one of aluminum, magnesium, titanium and zinc); and an oxide obtained by substituting part of nickel of cobalt-substituted lithium nickelate with another metal element (for example, at least one of aluminum, magnesium, titanium and zinc). One of these lithium composite oxides may be singly used, or two or more of these may be mixedly used.

The positive electrode active material used in the lithium ion secondary battery according to the exemplary embodiment of the present invention preferably contains the lithium iron manganese-based composite oxide having a layered rock-salt structure and represented by the above-described formula (1). If the lithium iron manganese-based composite oxide is used, a lithium ion secondary battery having high capacity can be formed at low cost, and in addition, it can contribute to the formation of the coating of the negative electrode active material of the present exemplary embodiment, and a lithium ion secondary battery excellent in the cyclability can be formed.

In the formula (1), x preferably satisfies the condition of $1.16 \leq x \leq 1.32$. Besides, s preferably satisfies the condition of $0.16 \leq s \leq 0.45$. In addition, δ preferably satisfies the condition of $0.02 \leq δ \leq 0.50$.

As compared with a lithium nickel manganese-based composite oxide (wherein $M^2$ contains at least Ni instead of Fe) and a lithium cobalt manganese-based composite oxide (wherein $M^2$ contains at least Co instead of Fe), the lithium iron manganese-based composite oxide having a layered rock-salt structure in which $Li_2M^1O_3$ (wherein $M^1$ contains at least Mn) and $LiM^2O_2$ (wherein $M^2$ contains at least Fe) are solid dissolved is excellent in that a lithium ion secondary battery having a high energy density can be obtained when used as the positive electrode active material for the lithium ion secondary battery.

The lithium ion secondary battery using, as the positive electrode active material, the lithium iron manganese-based composite oxide having a layered rock-salt structure is preferably subjected to an activation treatment before use. For example, the battery is charged at a constant current (20 mA/g: a current value per g of positive electrode active material) to a predetermined voltage (of, for example, 4.5 V), and then discharged at a constant current (20 mA/g: a current value per g of positive electrode active material) to a predetermined voltage (of, for example, 1.5 V). This charging/discharging is preferably repeated by a plurality of times (for example, twice). Thereafter, the package of the battery may be opened to reduce the inside pressure for degassing, and then it may be packaged again. If such an activation treatment is performed, the positive electrode active material can be activated. Besides, a lithium ion deintercalated from the positive electrode active material in the activation treatment is intercalated by the negative electrode active material containing Si as a constituent element, so that the irreversible capacity of the negative electrode active material can be reduced.

Furthermore, in the activation treatment, at the time of performing the charging/discharging operation including the initial charging, if the charging is performed with a final voltage or a charging current changed in a stepwise manner (which operation is hereinafter referred to as the "stepwise charging"), a good coating can be formed on the negative electrode so as to improve cyclability.

The stepwise charging can be performed by any of the following two methods: A first method is a method in which a charging final voltage is increased in a stepwise manner with a charging current retained constant over the respective charging steps. Specifically, constant current charging is performed at a predetermined current value to a predetermined final voltage (and the constant voltage charging is performed further at the final voltage in some cases), followed by discharging, the constant current charging is performed at the same current value as in the previous charging to a final voltage higher than the previous final voltage (and the constant voltage charging is performed further at the final voltage in some cases), followed by discharging, and these charging and discharging are repeated. The increase value of the final voltage increased in each step can be set to a range of 0.05 to 0.5 V, and is preferably set to a range of 0.08 to 0.2 V.

A second method is a method in which a charging current value is changed from a higher value to a lower value in a stepwise manner with a charging final voltage retained constant over the respective charging steps. Specifically, the constant current charging is performed at a predetermined current value to a predetermined final voltage, followed by discharging, the constant current charging is performed at a current value lower than the current value in the previous charging to the same final voltage as in the previous charging, followed by discharging, and these charging and discharging are repeated. The decrease value of the charging current lowered in each step can be set to a range of 10 to 60% of the initial charging rate, and is preferably set to a range of 20 to 50%. For example, if the initial charging rate is 0.5 C, the next charging rate is preferably set to 0.05 to 0.3 C, and more preferably set to 0.1 to 0.25 C.

In either of the first and second methods, the number of charging steps is preferably 2 or more, and more preferably 3 or more. As the number of steps is larger, a more excellent effect can be attained. If the number of steps is too large, however, the activation treatment is complicate and takes longer time, and therefore, the number of steps is preferably 10 or less and more preferably 8 or less.

The ratio of the lithium iron manganese-based composite oxide represented by the above-described formula (1) in the positive electrode active material used in the lithium ion secondary battery of the present exemplary embodiment is, from the viewpoint of attaining a sufficient effect by containing it, preferably 80% by mass or more, more preferably 90% by mass or more, further preferably 95% by mass or more, and may be 100% by mass.

As for the average particle size of the positive electrode active material, from the viewpoint of the reactivity with the electrolyte and the rate characteristics, a positive electrode active material having an average particle size in a range of, for example, 0.1 to 50 μm can be used, a positive electrode active material having an average particle size in a range of 1 to 30 μm can be preferably used, and that having an average particle size in a range of 5 to 25 μm can be more preferably used. Here, the average particle size refers to a 50% cumulative diameter (median diameter: $D_{50}$) obtained through the size distribution (based on volume) by the laser diffraction scattering method.

The binding agent for the positive electrode is not especially limited, and those described as the binding agent for the negative electrode can be used. In particular, from the viewpoint of versatility and low cost, polyvinylidene fluoride is preferably used. The content of the binding agent for the positive electrode is, from the viewpoint of the binding force and the energy density in the trade-off relationship, preferably in a range of 1 to 25% by mass, more preferably in a range of 2 to 20% by mass, and further preferably in a range of 2 to 10% by mass on the basis of the positive electrode active material. Examples of the binding agent, in addition to polyvinylidene fluoride (PVdF), include a vinylidene fluoride-hexafluoropropylene copolymer, a vinylidene fluoride-tetrafluoroethylene copolymer, a styrene-butadiene copolymer rubber, polytetrafluoroethylene, polypropylene, polyethylene, polyimide, polyamide-imide, and acrylic resins. As the slurry solvent, N-methyl-2-pyrrolidone (NMP) can be used.

The thickness of the positive electrode active material layer (the thickness of the single layer excluding the current collector) can be set to a range of 1 μm or more and 200 μm or less, and is preferably in a range of 20 μm or more and 150 μm or less.

The positive electrode current collector is not especially limited, and from the viewpoint of electrochemical stability, aluminum, titanium, tantalum, stainless steel (SUS), another bubble metal or an alloy of any of these can be used. The shape is, for example, a foil, a plate, or a mesh. An aluminum foil can be particularly suitably used. The thickness of the positive electrode current collector is not especially limited, and can be set to, for example, a range of 5 to 50 μm, and is preferably in a range of 10 to 40 μm.

In producing the positive electrode, a conductive auxiliary agent may be added for lowering the impedance. Examples of the conductive auxiliary agent include a carbonaceous fine particle such as graphite, carbon black, acetylene black or ketjen black, a metal particle of aluminum or the like, and a conductive oxide particle. The addition content of the conductive auxiliary agent can be set to, based on the positive electrode active material, a range of 1 to 20% by mass, and is preferably in a range of 2 to 10% by mass.

(Lithium Ion Secondary Battery)

The lithium ion secondary battery of the exemplary embodiment includes the positive electrode containing the above-described positive electrode active material, the above-described negative electrode, and the electrolyte.

An example of the secondary battery of the present exemplary embodiment of the present invention is illustrated in FIG. 1. In the secondary battery of FIG. 1, a positive electrode is constituted by forming a positive electrode active material layer 1 containing a positive electrode active material on a positive electrode current collector 1A. Besides, a negative electrode is constituted by forming a negative electrode active material layer 2 on a negative electrode current collector 2A. The positive electrode and the negative electrode are immersed in an electrolyte, and are disposed and stacked to oppose each other with a separator 3 sandwiched therebetween. Besides, the positive electrode is connected to a positive electrode tub 1B, and the negative electrode is connected to a negative electrode tub 2B. A power generating element including the positive electrode and the negative electrode is contained in a package 4, with the positive electrode tub 1B and the negative electrode tub 2B exposed outside.

In such a lithium ion secondary battery, when a voltage is applied to the positive electrode and the negative electrode, a lithium ion is desorbed from the positive electrode active material, and the lithium ion is intercalated by the negative electrode active material, and thus, charging is caused. Besides, when the electrical contact between the positive electrode and the negative electrode is caused outside the secondary battery, a lithium ion is deintercalated from the negative electrode active material and intercalated by the positive electrode active material reversely to the charging, and thus, discharging occurs.

As the electrolyte used in the secondary battery of the present exemplary embodiment, a solution obtained by dissolving, as a supporting salt, a lithium salt in a non-aqueous solvent can be used. The non-aqueous solvent is not especially limited, and examples include cyclic carbonates such as ethylene carbonate (EC), propylene carbonate (PC), butylene carbonate (BC) and vinylene carbonate (VC); chain carbonates such as dimethyl carbonate (DMC), diethyl carbonate (DEC), ethyl methyl carbonate (EMC) and dipropyl carbonate (DPC); aliphatic carboxylates such as methyl formate, methyl acetate and ethyl propionate; γ-lactones such as γ-butyrolactone; chain ethers such as 1,2-diethoxyethane (DEE) and ethoxy methoxy ethane (EME); and cyclic ethers such as tetrahydrofuran and 2-methyltetrahydrofuran. As another non-aqueous solvent, a non-protonic organic solvent such as dimethyl sulfoxide, 1,3-dioxolane, a dioxolane derivative, formamide, acetamide, dimethyl formamide, acetonitrile, propylnitrile, nitromethane, ethyl monoglyme, phosphate triester, trimethoxy methane, sulfolane, methyl sulfolane, 1,3-dimethyl-2-imidazolidinone, 3-methyl-2-oxazolidinone, a propylene carbonate derivate, a tetrahydrofuran derivative, ethyl ether, 1,3-propanesultone, anisole, N-methylpyrrolidone, or fluorinated carboxylate can be used. One of these may be singly used, or two or more of these may be used together. Among these, from the viewpoint of the stability at a high voltage and the viscosity of the solvent, a mixed solution of a cyclic carbonate and a chain carbonate can be suitably used as the solvent.

The lithium salt to be dissolved in the non-aqueous solvent is not especially limited, and examples include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiC_4F_9SO_3$, $LiC(CF_3SO_2)_3$, $LiN(CF_3SO_2)_2$, $LiN(C_2F_5SO_2)_2$, and lithium bis(oxalato)borate. One of these may be singly used, or two or more of these may be used together.

The concentration in the electrolyte solution of the lithium salt used as the supporting salt can be set to a range of, for example, 0.5 to 2 mol/L, and is preferably in a range of 0.7 to 1.8 mol/L. If the concentration of the lithium salt is 0.5 mol/L or more, sufficient electrical conductivity can be attained. Besides, if the concentration of the lithium salt is 2 mol/L or less, increase of the density and the viscosity can be suppressed.

It is noted that a polymer electrolyte obtained by solidifying an electrolyte solution into a gel form by adding a polymer or the like to a solvent of the electrolyte solution can be used.

In the production of the secondary battery of the present exemplary embodiment, the positive electrode and the negative electrode are disposed to oppose each other with the separator sandwiched therebetween without electrically connecting to each other under, for example, a dry air or inert gas atmosphere. As the separator, a porous film or a woven or nonwoven fabric of a polyolefin resin such as polyethylene or polypropylene (PP), a fluorine resin such as polyvinylidene fluoride, or a resin of polyimide, polyamide or the like can be used.

An electrode pair (a power generating element) of the positive electrode and the negative electrode opposing each other with the separator sandwiched therebetween can be directly with keeping its laminated shape, or cylindrically wound, and contained in the package.

As the package, a battery can, a laminate film that is a laminated material of a synthetic resin and a metal foil, or the like can be used. The laminate film contains a resin base, a metal foil layer and a thermal sealing layer (sealant). As the resin base, polyester or nylon can be used, and as the metal foil layer, an aluminum, aluminum alloy or titanium foil can be used. As the material of the thermal sealing layer, a thermoplastic polymer material such as polyethylene, polypropylene or polyethylene terephthalate can be used. Besides, the number of each of the resin base layer and the metal foil layer is not limited to one but may be two or more. From the viewpoint of versatility and cost, an aluminum laminate film is suitably used.

The positive electrode tub is connected to the positive electrode, the negative electrode tub is connected to the negative electrode, and these electrode tubs are disposed to be exposed outside the package. The package is sealed with a part left, and after injecting the electrolyte solution through the left part, the package is sealed up, and thus, the secondary battery can be produced.

The shape of the power generating element of the positive electrode and the negative electrode opposing each other with the separator sandwiched therebetween is not especially limited, and can be of a winding type, a laminated type or the like. The shape or the form of the secondary battery can be of a cylindrical type, a rectangular type, a coin type, a button type, or a laminated type.

The secondary battery produced as described above can be subjected to the activation treatment through the stepwise charging described above.

EXAMPLES

The present exemplary embodiment will now be described in more detail with reference to examples.

Example 1

(Production of Positive Electrode)

As a positive electrode active material, a lithium iron manganese-based composite oxide having a layered rock-salt structure and represented by $Li_{1.23}Mn_{0.48}Ni_{0.15}Fe_{0.16}O_2$ was used. The positive electrode active material, a conductive auxiliary agent (a carbon material), a binder (PVdF) and a solvent (NMP) were mixed to prepare a slurry. A mixing ratio (mass ratio) among the positive electrode active material, the conductive auxiliary agent and the binder was set as the active material: conductive auxiliary agent:binder=92:

4:4. The slurry was applied to an aluminum foil, and after drying and rolling, the resultant was cut into a disk shape of 12 mmφ to be used as a positive electrode. Here, the thickness of the coating was 150 μm.

(Production of Negative Electrode)

As a negative electrode active material, SiO was used. The negative electrode active material, a conductive auxiliary agent (a carbon material), a binder (polyimide) and a solvent (NMP) were mixed to prepare a slurry. A mixing ratio (mass ratio) among the negative electrode active material, the conductive auxiliary agent and the binder was set as the active material: conductive auxiliary agent:binder=80:5:15. The slurry was applied and dried on a copper foil, the resultant was burnt at 350° C. for 1 hour under a nitrogen atmosphere, and cut into a disk shape of 13 mmφ to be used as a negative electrode. Here, the thickness of the coating (negative electrode active material layer) was 35 μm.

(Production of Cell and Evaluation)

The above-described positive electrode and negative electrode, a separator of polypropylene, and an electrolyte solution obtained by dissolving 1M $LiPF_6$ in a mixed solvent of EC and DEC (volume ratio: EC/DEC=3/7) were used to produce a coin cell.

The coin cell was charged/discharged under environment of a temperature of 45° C. First, for the activation, the cell was charged at 1.3 mA to 4.5 V, and then discharged at 1.3 mA to 1.5 V. Thereafter, the cell was subjected to 20 charging/discharging cycles, in each of which it was charged at 1.3 mA to 4.5 V, and then discharged at 1.3 mA to 1.5 V.

Example 2

A coin cell was prepared and charged/discharged in the same manner as in Example 1 except that the charging/discharging for the activation was performed as described below.

In the activation treatment, first, the cell was charged at 1.3 mA to 4.2 V, discharged at 1.3 mA to 1.5 V, then charged at 1.3 mA to 4.3 V, discharged at 1.3 mA to 1.5 V, and then charged at 1.3 mA to 4.4 V and discharged at 1.3 mA to 1.5 V, and finally charged at 1.3 mA to 4.5 V and discharged at 1.3 mA to 1.5 V.

Comparative Example 1

A coin cell was produced and charged/discharged in the same manner as in Example 1 except that an oxide represented by $Li_{1.27}Mn_{0.55}Ni_{0.18}O_2$ was used as a positive electrode active material.

(Evaluation Results)

In each of the coin cells of Example 1, Example 2 and Comparative Example 1, the discharge capacity was measured in the 1st and 20th cycles, so as to obtain the capacity retention in accordance with the following expression. The results are shown in Table 1.

Capacity retention (%)=(discharge capacity in 20th cycle/discharge capacity in 1st cycle)×100

TABLE 1

|  | Capacity retention after charging/discharging cycles |
|---|---|
| Example 1 | 60% |
| Example 2 | 89% |
| Comparative Example 1 | 48% |

(Analysis of Coating)

The composition of the coating of the negative electrode obtained after completing the 1st cycle of Example 1 was analyzed as follows.

The coating of the negative electrode (the negative electrode active material layer) was dissolved with an acid, and mass ratios of Fe, Mn and Ni to Si therein were obtained by ICP (Inductively Coupled Plasma) emission spectroscopic analysis. The results are shown in Table 2.

TABLE 2

|  | Mass ratio of Fe, Mn or Ni to Si |
|---|---|
| Fe | 0.0058% |
| Mn | 0.089% |
| Ni | 0.074% |

Figure 2:
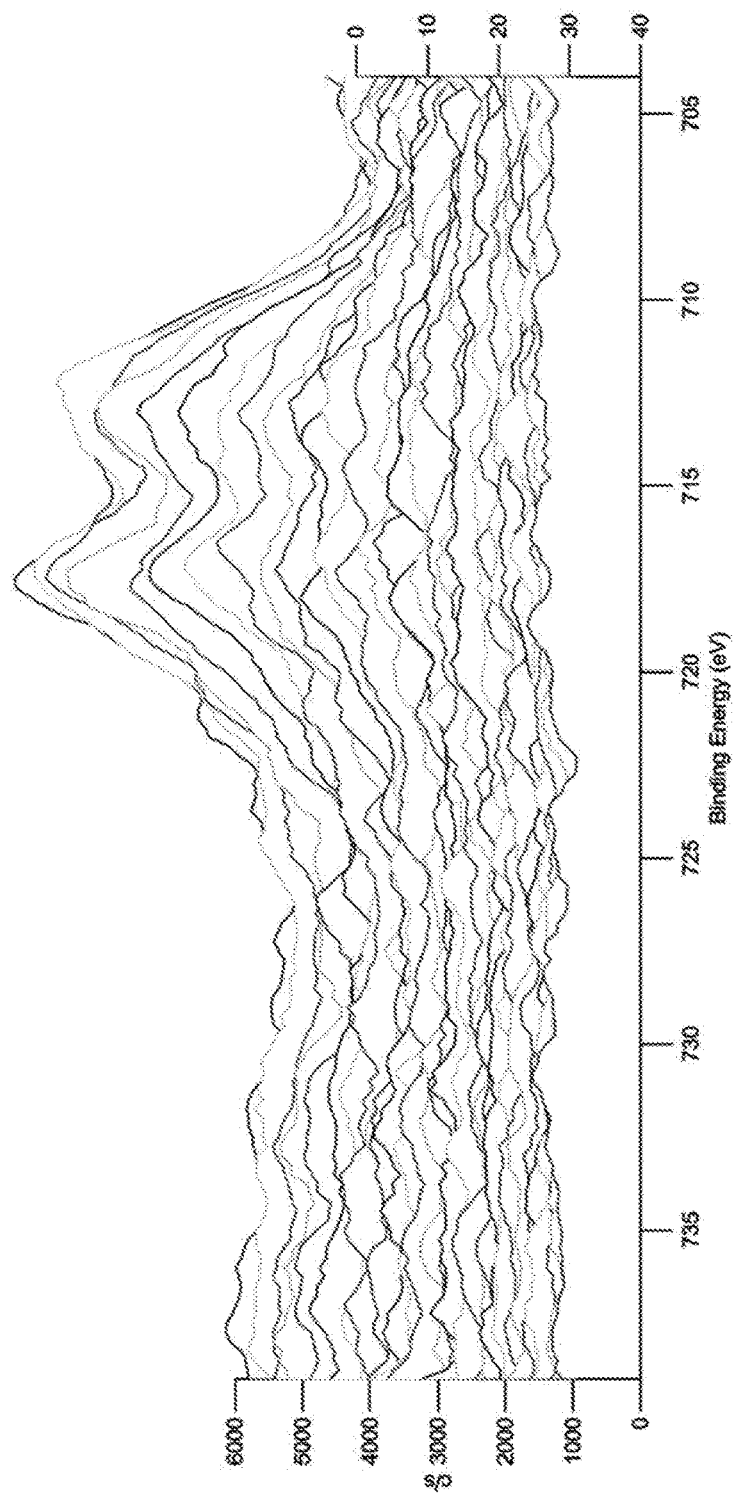
FIG. 2 illustrates a profile of Fe (2p), obtained by XPS, in the depth direction in a negative electrode of Example 1.
Figure 3:
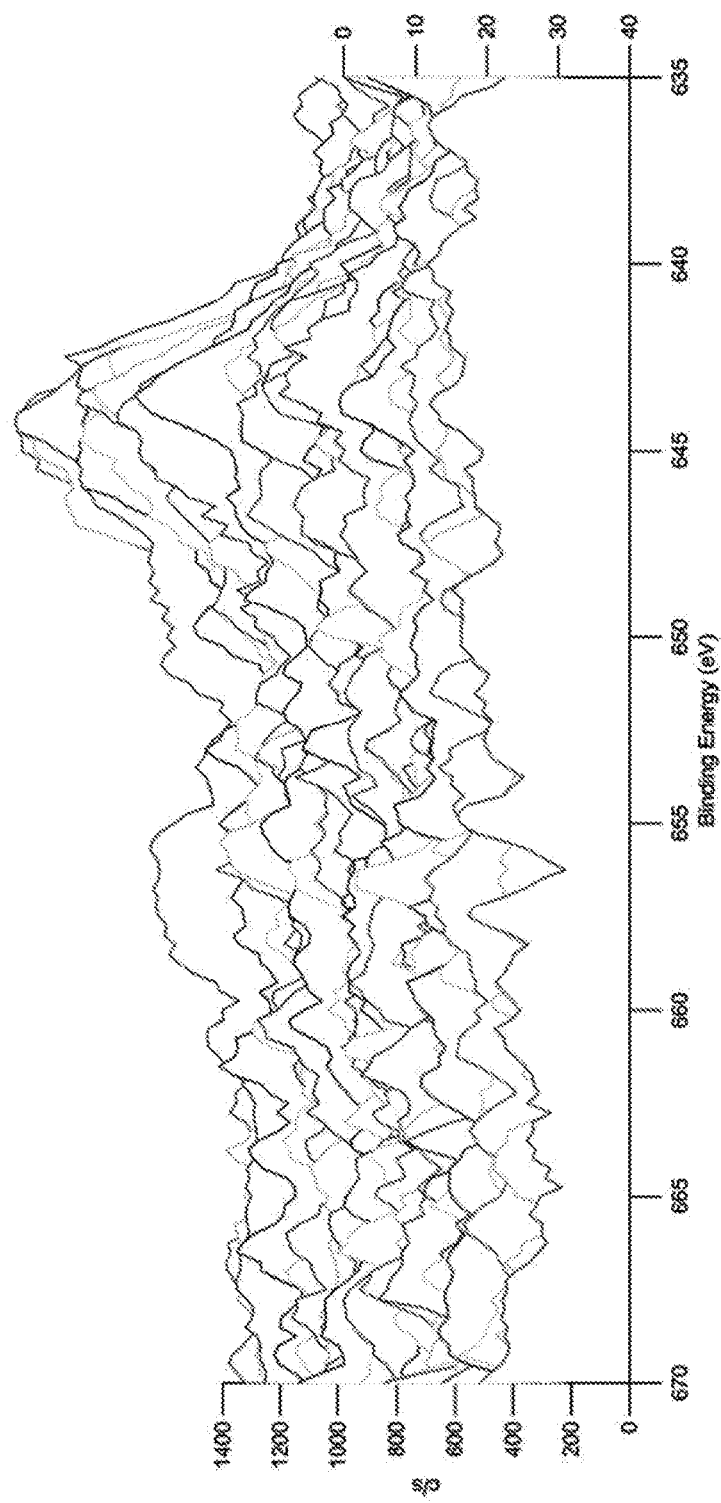
FIG. 3 illustrates a profile of Mn (2p), obtained by the XPS, in the depth direction in the negative electrode of Example 1.
Figure 4:
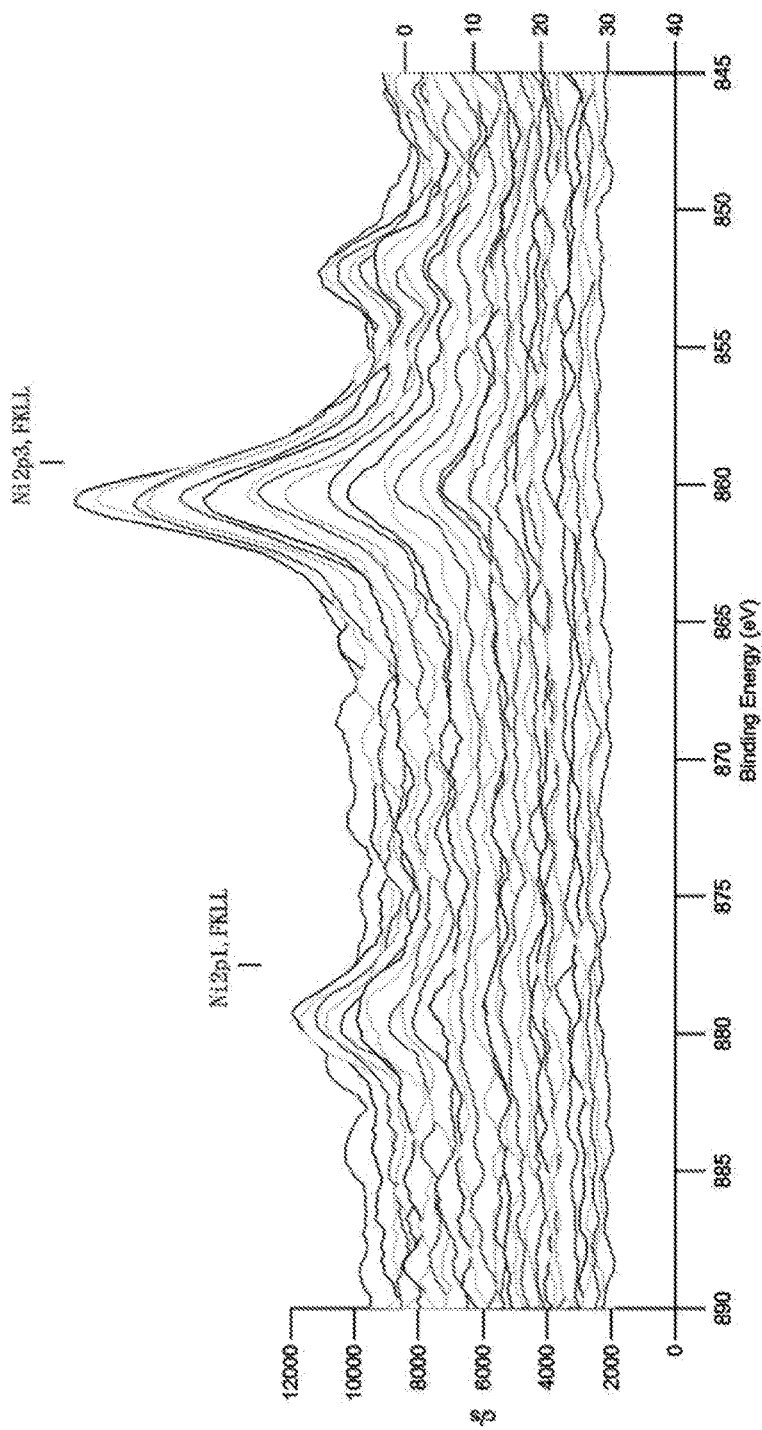
FIG. 4 illustrates a profile of Ni (2p), obtained by the XPS, in the depth direction in the negative electrode of Example 1.

Besides, while etching the surface of the negative electrode with Ar+ ions, the change in the depth direction of the concentrations of Fe, Mn and Ni was examined by XPS (X-ray photoelectron spectroscopy), and it was confirmed that all these elements were present merely in shallow portions from the surface of the negative electrode (FIGS. 2 to 4). Besides, although Si was not observed in the outermost surface of the negative electrode, O was observed. It is noted that FIG. 2 illustrates a profile of Fe (2p), obtained by the XPS, in the depth direction in the negative electrode of Example 1. FIG. 3 illustrates a profile of Mn (2p), obtained by the XPS, in the depth direction in the negative electrode of Example 1. FIG. 4 illustrates a profile of Ni (2p), obtained by the XPS, in the depth direction in the negative electrode of Example 1. In these drawings, the ordinate on the right side indicates a distance (depth in terms of $SiO_2$/nm) from the surface, in which 0 corresponds to the outermost surface. The abscissa indicates binding energy (unit: eV), and the ordinate on the left side indicates c/s (unit: count/sec).

In consideration of these results and the evaluation result of the cyclability, it is presumed that not only Mn and Ni but also Fe were eluted from the positive electrode in Example 1 to be incorporated into the coating on the surface of the negative electrode, and as a result of forming the coating containing Fe, Mn and O (namely, the coating containing an oxide of the metals derived from the positive electrode), the cyclability were improved. Besides, it was found that the coating effective to improve cyclability is formed by performing the stepwise charging in the activation treatment.

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

This application claims the right of priority based on Japanese Patent Application No. 2013-173284, filed on Aug. 23, 2013, the entire content of which are incorporated herein by reference.

REFERENCE SIGNS LIST 1 positive electrode active material layer
1A positive electrode current collector
1B positive electrode tub
2 negative electrode active material layer
2A negative electrode current collector
2B negative electrode tub
3 separator
4 package

What is claimed is:

1. A lithium ion secondary battery comprising a positive electrode containing a positive electrode active material, a negative electrode, and an electrolyte, wherein the negative electrode comprises a negative electrode active material layer containing a negative electrode active material comprising silicon (Si) as a constituent element, wherein a coating comprising iron (Fe), manganese (Mn) and oxygen (O) as constituent elements is formed on a surface of the negative electrode active material layer, and a ratio (Fe/Si) of Fe of the coating to Si of the negative electrode active material layer is in a range of 0.001% by mass or more and 1.0% by mass or less; and the positive electrode active material comprises a lithium iron manganese-based composite oxide having a layered rock-salt structure and represented by the following formula (1):

$$Li_xM^1{}_yM^2{}_{z-s}Fe_sO_{2-\delta} \tag{1}$$

wherein x, y, z, s and δ satisfy conditions of 1.05≤x≤1.32, 0.33≤y≤0.63, 0.06≤z≤0.50, 0.06≤s≤0.50, z≥s, and 0≤δ≤0.80, $M^1$ represents at least one metal element selected from Mn, Ti and Zr, and including Mn, and $M^2$ represents at least one metal element selected from Co, Ni and Mn.

2. The lithium ion secondary battery according to claim 1, wherein the coating is a coating comprising Fe and Mn that are metal elements derived from the positive electrode.

3. The lithium ion secondary battery according to claim 1, wherein the coating is a coating that is formed by performing at least constant current charging with a final voltage or a charging current changed in a stepwise manner at the time of performing an activation treatment by a charging/discharging operation including initial charging, and comprises Fe and Mn that are metal elements derived from the positive electrode.

4. The lithium ion secondary battery according to claim 1, wherein the coating is a coating that is formed by performing at least constant current charging with a final voltage increased in a stepwise manner at the time of performing an activation treatment by a charging/discharging operation including initial charging, and comprises Fe and Mn that are metal elements derived from the positive electrode.

5. The lithium ion secondary battery according to claim 1, wherein a ratio (Mn/Si) of Mn of the coating to Si of the negative electrode active material layer is in a range of 0.01% by mass or more and 5.0% by mass or less.

6. The lithium ion secondary battery according to claim 1, wherein the coating further comprises nickel (Ni) as a constituent element.

7. The lithium ion secondary battery according to claim 6, wherein a ratio (Ni/Si) of Ni of the coating to Si of the negative electrode active material layer is in a range of 0.01% by mass or more and 5.0% by mass or less.

8. The lithium ion secondary battery according to claim 1, wherein a thickness of the negative electrode active material layer is in a range of 1 μm or more and 100 μm or less.

9. A lithium ion secondary battery comprising a positive electrode containing a positive electrode active material, a negative electrode, and an electrolyte, wherein the negative electrode comprises a negative electrode active material layer containing a negative electrode active material comprising silicon (Si) as a constituent element, wherein a coating comprising iron (Fe), manganese (Mn) and oxygen (O) as constituent elements is formed on a surface of the negative electrode active material layer, and a ratio (Mn/Si) of Mn of the coating to Si of the negative electrode active material layer is in a range of 0.01% by mass or more and 5.0% by mass or less; and the positive electrode active material comprises a lithium iron manganese-based composite oxide having a layered rock-salt structure and represented by the following formula (1):

$$Li_xM^1{}_yM^2{}_{z-s}Fe_sO_{2-\delta} \tag{1}$$

wherein x, y, z, s and δ satisfy conditions of 1.05≤x≤1.32, 0.33≤y≤0.63, 0.06≤z≤0.50, 0.06≤s≤0.50, z≥s, and 0≤δ≤0.80, $M^1$ represents at least one metal element selected from Mn, Ti and Zr, and including Mn, and $M^2$ represents at least one metal element selected from Co, Ni and Mn.

10. The lithium ion secondary battery according to claim 9, wherein the coating further comprises nickel (Ni) as a constituent element.

11. The lithium ion secondary battery according to claim 10, wherein a ratio (Ni/Si) of Ni of the coating to Si of the negative electrode active material layer is in a range of 0.01% by mass or more and 5.0% by mass or less.

12. The lithium ion secondary battery according to claim 9, wherein a thickness of the negative electrode active material layer is in a range of 1 μm or more and 100 μm or less.

13. A method for producing a lithium ion secondary battery comprising a positive electrode containing a positive electrode active material, a negative electrode, and an electrolyte, wherein the negative electrode comprises a negative electrode active material layer containing a negative electrode active material comprising silicon (Si) as a constituent element, wherein a coating comprising iron (Fe), manganese (Mn) and oxygen (O) as constituent elements is formed on a surface of the negative electrode active material layer; and the positive electrode active material comprises a lithium iron manganese-based composite oxide having a layered rock-salt structure and represented by the following formula (1):

$$Li_xM^1{}_yM^2{}_{z-s}Fe_sO_{2-\delta} \tag{1}$$

wherein x, y, z, s and δ satisfy conditions of 1.05≤x≤1.32, 0.33≤y≤0.63, 0.06≤z≤0.50, 0.06≤s≤0.50, z≥s, and 0≤δ≤0.80, $M^1$ represents at least one metal element selected from Mn, Ti and Zr, and including Mn, and $M^2$ represents at least one metal element selected from Co, Ni and Mn, the method comprising:

forming the coating comprising Fe and Mn that are metal elements derived from the positive electrode on the surface of the negative electrode active material layer by performing at least constant current charging with a final voltage or a charging current changed in a stepwise manner at the time of performing an activation treatment by a charging/discharging operation including initial charging wherein at least one of a ratio (Fe/Si) of Fe of the coating to Si of the negative electrode active material layer is in a range of 0.001% by mass or more and 1.0% by mass or less and a ratio (Mn/Si) of Mn of the coating to Si of the negative electrode active material layer is in a range of 0.01% by mass or more and 5.0% by mass or less.

14. The method for producing the lithium ion secondary battery according to claim 13, wherein the coating comprising the metal elements derived from the positive electrode is formed on the surface of the negative electrode active material layer by performing at least constant current charging with the final voltage increased in a stepwise manner at the time of performing the activation treatment.

15. The method for producing the lithium ion secondary battery, according to claim 13, wherein the coating further comprises nickel (Ni) as a constituent element.

16. The method for producing the lithium ion secondary battery, according to claim 15, wherein a ratio (Ni/Si) of Ni of the coating to Si of the negative electrode active material layer is in a range of 0.01% by mass or more and 5.0% by mass or less.

17. The method for producing the lithium ion secondary battery, according to claim 13, wherein a thickness of the negative electrode active material layer is in a range of 1 μm or more and 100 μm or less.

* * * * *